UNITED STATES PATENT OFFICE.

ERNEST HOPKINSON, OF NEW YORK, N. Y.

PROCESS OF TREATING FIBROUS MATERIAL AND PRODUCT THEREOF.

1,411,786.  Specification of Letters Patent.  Patented Apr. 4, 1922.

No Drawing.  Application filed April 24, 1920. Serial No. 376,373.

*To all whom it may concern:*

Be it known that I, ERNEST HOPKINSON, a citizen of the United States, residing at New York, in the county of New York and State of New York, have invented a certain new and useful Process of Treating Fibrous Material and Product Thereof, of which the following is a full, clear, and exact description.

The present invention comprises a process of treating fibrous materials with a water emulsion of rubber which water emulsion preferably is the latex of the rubber tree. As herein used the term "latex" refers to this product of the rubber tree containing a normal amount of water or to the product diluted or concentrated as desired. The term "fibrous material" means any aggregation of fibres, whether cotton or other material, associated together in the form of a roving, thread, strand, yarn, or cord, unfabricated or fabricated to form a knitted, woven or other fabric.

In almost all so-called rubber articles, the strengthening or strain-resisting element consists of fibrous material—chiefly cotton—either in the form of cords or threads, or in the form of a knitted or woven fabric. In the ordinary process of preparing these threads or fabrics for use in a rubber article to be subjected to the vulcanizing operation, the threads, cords or woven fabrics are subjected to a process by which rubber is applied to them. In the case of a heavy cord, it has been the practice to feed a core of rubber into the centre of the strands or cable in the twisting operation of forming a larger cord. In the case of smaller strands or yarns which are used in what are called "cord" tires, the threads are held in parallel relationship by weak weft threads, and usually rubberized by being immersed in a rubber solution made by dissolving rubber in benzine. This same process is also used in rubberizing square-woven fabric, which is used in tires, boots and shoes, and vulcanized rubber goods generally. After this solutioning process, the fabric is subjected to further rubberizing processes, such as frictioning, in which the solutioned fabric is passed through rolls rotating at different speeds, and warm rubber dough is "frictioned" or rubbed onto the surface of the fabric. Another process is what is called "skim-coating", in which a sheet of rubber is applied to the surface of the fabric by the fabric being passed through rolls running at even speed, one of the rolls carrying a thin sheet of rubber, which rubber adheres to the fabric passing through, and is pressed into contact by the rolls. Still another process of rubberizing consists in spreading a mass of rubber made very soft and plastic by a suitable solvent, this plastic mass of rubber being spread over the fabric by a stationary knife or spreading blade as the fabric passes underneath it. Sometimes all of these processes are used, while in other cases, only one or more of the processes referred to are used. The fabric thus rubberized is then cut to suitable size and shape, and associated with crude rubber and built into the form of the article desired, and then subjected to the vulcanizing operation.

Of course, it is true that where a core of unvulcanized rubber is twisted in with the strands to make up a heavier cord, there is rubber on the inside of the heavy cord, and some is squeezed through to the outside between individual strands, but this does not accomplish the object of my invention, which is to cause rubber to enter the individual thread or yarn.

I have found that if a thread or yarn is immersed in rubber latex, the rubber penetrates to the very centre of the strand and, in fact, a microscopic examination of individual cotton fibres so treated shows that the rubber is present in the hollow tubular structure of many of the individual cotton fibres. Threads or yarns so treated with rubber latex, whether the threads or yarns are individual or are comprised in a knitted or woven fabric, have very great advantages over threads or yarns or woven fabrics treated by the processes heretofore in use, when associated with rubber in the vulcanizing operation. The whole object of rubberizing the fabric prior to its association with crude rubber compounds is to cause the union of the rubber with the fabric in the vulcanizing operation. When this union is broken, the rubber article rapidly begins to deteriorate. In the case of tires, the breaking of this union is called "separation", and is usually the initial stage of destruction, which progresses rapidly from this point on. With threads or yarns treated with rubber latex, tests have shown that the union lasts approximately three times as long as is the case with threads or yarns treated by the processes heretofore in use.

There are many ways in which the process can be carried into practice. For instance, the rubber latex containing one-third per cent ammonia which serves to prevent natural coagulation of the latex may be sprayed or flowed in proper quantities on the surface of traveling threads, yarns or fabric; or the fibrous material may be led into and under the surface of a bath of latex, and the water of the latex driven off, either entirely or partially by evaporation; or after immersion, the excess latex may be squeezed out between rolls and the fibrous material dried thereafter; or a roll of fabric or yarns may be wound on a suitable arbor with spacing devices between successive convolutions, and the entire roll submerged in a bath of latex. If the most complete penetration is desired, the process may involve placing the fibrous material in an air-tight chamber, exhausting the chamber of air, then admitting latex. This process may also be carried a step further by breaking the vaccum while the fibrous material is below the surface of the latex, and then applying fluid pressure to the latex. By whatever means the fibrous material has been subjected to the action of the latex, it is afterwards subjected to any desired step by which the water or latex fluid is eliminated. Ordinarily, this will consist of the step of squeezing out excess moisture and then drying the fibrous material by the application of heat in any desired form. The elimination of the water is preferably carried out before vulcanization is undertaken.

If desired, vulcanizing or other ingredients may be added to the latex before the fibrous material and the latex are brought together. Sometimes it will be desirable to add material such as dissolved glue or glycerine or oil adapted to soften the resultant rubber to the latex in the desired proportion, to obtain any desired modification of the action on the fibrous material resulting from the application of rubber latex alone. Oils and glycerine act to soften the contained rubber, while glue is a filling material sometimes desirable to use.

By this latex treatment the fibrous material has its interior impregnated with rubber and a thin layer of rubber on its outer surface connected with the interiorly contained rubber. After the latex treatment it will be understood that the fibrous material may be put through any additional process for the purpose of applying a thin sheet of rubber to its surface, such as any one or more of the old processes of "spreading", "frictioning" and "skim-coating". Usually such will be the practice ordinarily followed.

The material thus rubberized is then cut to suitable size and shape and built into the form of the article desired, for example an automobile tire, and then subjected to the vulcanizing operation. Ordinarily, it is not necessary to add vulcanizing ingredients to the latex for the accomplishment of vulcanization, as the thin sheet of rubber applied to the fibrous material, as mentioned in the preceding paragraph, or other rubber associated with the threads coated as described, will ordinarily contain sulphur or other vulcanizing ingredient which during the vulcanizing process diffuses through into the rubber provided by the coating, and causes its vulcanization.

One very important result achieved by the practice of the process subject of this application is found in its utilization in the manufacture of automobile tires. It has been found that threads or yarns or fabric made of short staple cotton of quality generally considered not good enough for use in the carcass of an automobile tire, when subjected to this impregnation process, are so improved in their qualities and their resistance to the tendency to separation resulting from the flexing of the tire carcass when used, that they give service equal to that of threads or yarns or fabric made of cotton of high quality and high price, thus materially reducing the cost of a tire. The advantages of the process are also present in fabrics used for other purposes than the manufacture of tires, but that field of use is referred to because it is of such importance and wide extent at the present time. Another advantage is the possibility of improving the flexing qualities of cheap fibres, other than cotton, such as hemp, and the like. It is believed that the new result obtained by the use of latex, in impregnating fibrous material, results from the fact that the rubber in solution or suspension in the latex is in globules so minute as to be capable of being carried into the small interstices of the fibrous material by the fluid vehicle of the latex, and this, because the rubber has never been coagulated or polymerized, while in the case of rubber dissolved in a hydro-carbon solvent, there is really no dissociation of the original globules of the latex, but merely a swelling of the rubber in the solvent, so that it cannot enter the body of the thread, yarn or fibrous material, no matter how thin the hydro-carbon rubber solution may be made. Of course it is apparent that there are other advantages in the process of treating fibres with a watery solution or suspension of rubber, such as latex, as compared with rubber dissolved is a hydro-carbon solvent, in that the cost of the hydro-carbon solvent and the necessity of recovering same and the precautions against fire, are all eliminated.

Having thus described my invention what

I claim and desire to protect by Letters Patent is:

1. A process of treating fibrous material including thread, fabric or similar material which comprises introducing rubber in the form of a water emulsion into the material, eliminating water from the material before vulcanization, and vulcanizing the so-treated material.

2. A process of treating fibrous material including thread, fabric or similar material which comprises applying rubber latex thereto, eliminating water therefrom before vulcanization, and vulcanizing the so-treated material.

3. A process of treating fibrous material including thread, fabric or similar material which comprises adding to rubber latex a material to prevent its coagulation, and then subjecting the fibrous material to the action of the latex so treated, eliminating water from the material before vulcanization, and vulcanizing the so-treated material.

4. A process of treating fibrous material including thread, fabric or similar material which comprises introducing rubber into the material by immersing the material in a water emulsion of rubber, eliminating water from the material before vulcanization, and vulcanizing the so-treated material.

5. A process of treating fibrous material including thread, fabric or similar material which comprises immersing the material in rubber latex, squeezing out the excess fluid, eliminating water from the material before vulcanization, and vulcanizing the so-treated material.

6. A process of treating fibrous material including thread, fabric or similar material which comprises exhausting air therefrom, introducing rubber into the body of the air-exhausted material by immersing the thread in rubber latex, eliminating water from the material prior to vulcanization, and vulcanizing the so-treated material.

7. A process of treating fibrous material including thread, fabric or similar material which comprises immersing the material in rubber latex, applying a fluid pressure to the surface of the latex, eliminating the water from the material prior to vulcanization, and vulcanizing the material.

8. A process of treating fibrous material including thread, fabric or similar material which comprises exhausting the air from the body of the material, introducing rubber into the air-exhausted thread by submerging the material in rubber latex, then applying a fluid pressure to the surface of the latex, eliminating the water from the material before vulcanization, and vulcanizing the material.

9. A process of treating fibrous material including thread, fabric or similar material which comprises adding to rubber latex ingredients adapted to modify the rubber of said latex, immersing the material in the latex so treated, eliminating water from the material prior to vulcanization, and vulcanizing the so-treated material.

10. A process of treating fibrous material including thread, fabric or similar material which comprises treating the material with a water emulsion of rubber, eliminating water from the material prior to vulcanization, making an additional application of rubber to the so-treated material, and vulcanizing the so-treated material.

11. A process of treating fibrous material including thread, fabric or similar material which comprises treating the material with rubber latex, eliminating water from the material prior to vulcanization, applying a layer of rubber containing a vulcanizing ingredient to the so-treated material, and vulcanizing the so-treated material.

12. A process of treating fibrous material including thread, fabric or similar material which comprises treating the material with rubber latex, eliminating water from the material prior to vulcanization, applying a layer of crude rubber containing sulphur to the so-treated material, and vulcanizing the so-treated material.

13. A process of treating fibrous material including thread, fabric or similar material which comprises applying rubber latex thereto, eliminating water therefrom before vulcanization, incorporating a vulcanizing agent throughout the mass, and vulcanizing the so-treated material.

14. A process of treating fibrous material including thread, fabric or similar material which comprises applying rubber latex thereto, eliminating water therefrom before vulcanization, incorporating a sulphur-containing vulcanizing agent throughout the mass, and vulcanizing the so-treated material.

15. A rubber article comprising fibrous material coated with latex, dried, and vulcanized.

Signed at New York, county of New York and State of New York, this 17th day of April, 1920.

ERNEST HOPKINSON.

Certificate of Correction.

It is hereby certified that in Letters Patent No. 1,411,786, granted April 4, 1922, upon the application of Ernest Hopkinson, of New York, N. Y., for an improvement in "Processes of Treating Fibrous Materials and Products Thereof," errors appear in the printed specification requiring correction as follows: Page 3, lines 43 and 58, claims 6 and 8, for the word "thread" read *material;* and that the said Letters Patent should be read with these corrections therein that the same may conform to the record of the case in the Patent Office.

Signed and sealed this 29th day of August, A. D., 1922.

[SEAL.]

KARL FENNING,
*Acting Commissioner of Patents.*

CERTIFICATE OF CORRECTION.

Patent No. 1,411,786. April 4, 1922.

ERNEST HOPKINSON.

It is hereby certified that error appears in the printed specification of the above numbered patent rquiring correction as follows: Page 2, first column, line 5, for "one-third" read 1-3; and that the said Letters Patent should be read with this correction therein that the same may conform to the record of the case in the Patent Office.

Signed and sealed this 22nd day of September, A. D. 1936.

Henry Van Arsdale (Seal) Acting Commissioner of Patents.